United States Patent
Goldstein

(10) Patent No.: US 7,271,543 B1
(45) Date of Patent: Sep. 18, 2007

(54) METHOD FOR PROVIDING BI-LEVEL ILLUMINATION IN A STAIR WELL

(76) Inventor: Jeffrey Jay Goldstein, 169 Pace Dr. South, West Islip, NY (US) 11795

(*) Notice: Subject to any disclaimer, the term of this patent is extended or adjusted under 35 U.S.C. 154(b) by 708 days.

(21) Appl. No.: 10/431,704

(22) Filed: May 9, 2003

(51) Int. Cl.
*H05B 37/02* (2006.01)

(52) U.S. Cl. .............. 315/153; 315/158; 315/316; 315/312; 315/360

(58) Field of Classification Search ........ 315/159, 315/149–158, 294, 312, 316, 360, DIG. 4
See application file for complete search history.

(56) References Cited

U.S. PATENT DOCUMENTS

| | | | | |
|---|---|---|---|---|
| 5,015,994 A | * | 5/1991 | Hoberman et al. ........ 340/567 |
| 5,357,170 A | * | 10/1994 | Luchaco et al. ............ 315/159 |
| 5,489,827 A | * | 2/1996 | Xia ............................ 315/294 |
| 5,637,964 A | * | 6/1997 | Hakkarainen et al. ...... 315/295 |
| 5,668,446 A | * | 9/1997 | Baker ......................... 315/294 |

* cited by examiner

*Primary Examiner*—Tuyet Vo
(74) *Attorney, Agent, or Firm*—Myron Amer P.C.

(57) ABSTRACT

A bi-level illumination system for power conservation correlated to the needs of a building stairwell, which even during work hours is only nominal functioning as it does as a back-up to elevator-provided access to work areas, and requiring high level illumination during off-hours which also occurs infrequently, by its focused stairwell end use permitting use of occupancy and time clock sensing means control of the high and low levels of illumination without the undue complexity of bi-level illumination systems used in work areas with constantly changing illumination needs.

1 Claim, 1 Drawing Sheet

METHOD FOR PROVIDING BI-LEVEL ILLUMINATION IN A STAIR WELL

Figure 1:
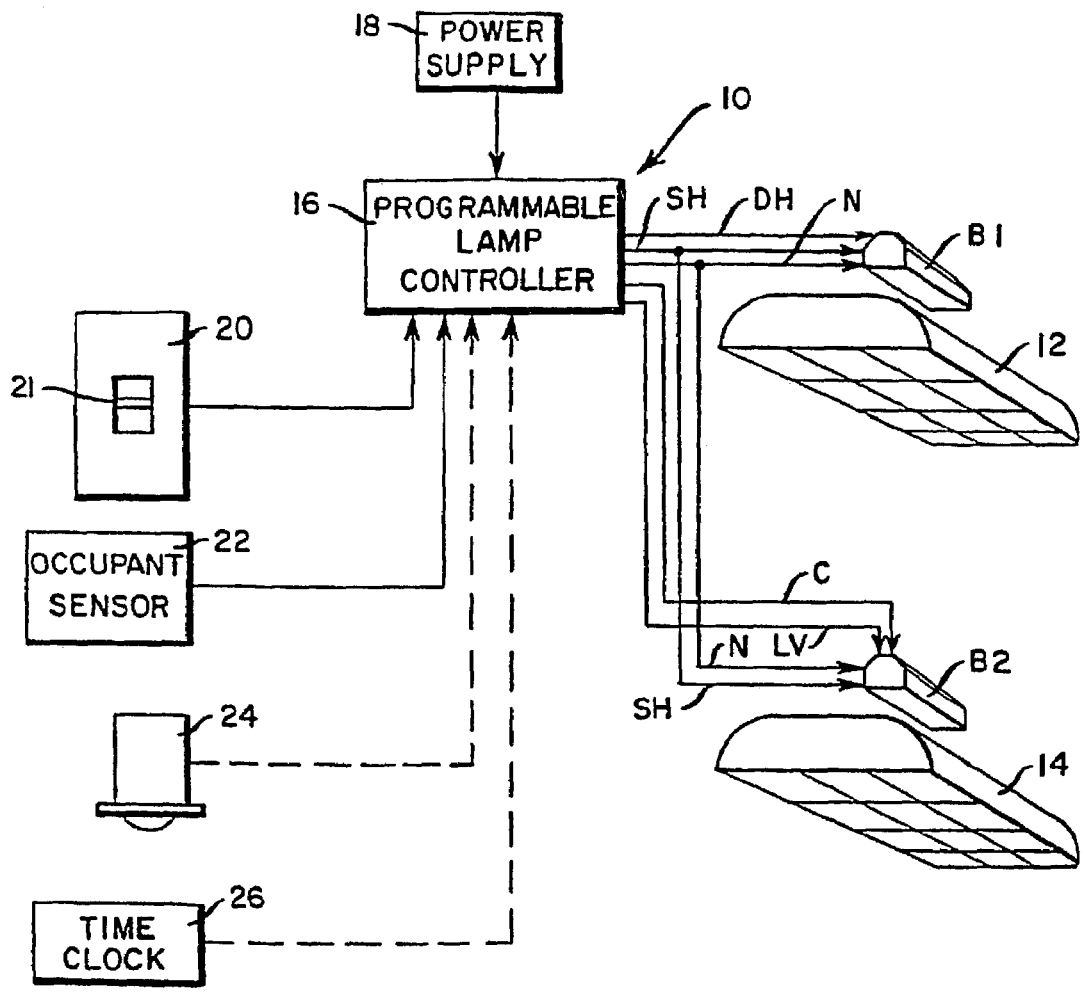

The present invention relates generally to improvements in a bi-level illumination system in which, more particularly, the system improvements are provided in a building construction stairwell site for reasons and with an operating mode resulting in significant conservation of power, all as will be better understood as the description proceeds.

EXAMPLE OF THE PRIOR ART

Bi-level illumination systems in which a high level of illumination is provided when needed, and a low level otherwise, are in common use because of the power conservation achieved by the management of the two, and sometimes additional levels of illumination. Illustrative of such a power conserving bi-level illumination system is that illustrated and described in U.S. Pat. No. 5,489,827 for "Light Controller with Occupancy Sensor" issued to Xia on Feb. 6, 1996.

In the '827 and all other known patents, the site of use of concern is an office or similar work area where there is significant activity, and the applied bi-level illumination system is by its construction and operating mode made to be responsive to the office or site of use significant activity, with the result that the illumination system is unduly complex. The failure of the prior art is in not practicing power conservation with illumination needs and illumination-providing components, in better synergistic or correlated relation to each other, to obviate the complexity noted.

Broadly, it is an object of the present invention to overcome the foregoing and other shortcomings of the prior art.

More particularly, it is an object to provide bi-level illumination correlated to specified end use needs of a nominal low level selected site of use during working hours and even less frequent needs during off-hours by said selected site of use being a building construction stairwell.

The description of the invention which follows, together with the accompanying drawings should not be construed as limiting the invention to the example shown and described, because those skilled in the art to which this invention appertains will be able to devise other forms thereof within the ambit of the appended claim.

FIG. 1 is a schematic illustration of a lighting control system embodying the present invention.

In the description which follows reference is made to individual components of a high level source of illumination 12, a low level source of illumination 14, a movement or occupant sensor 22, and a time duration sensing means or time clock 26, each of which is known as exemplified by U.S. Pat. No. 5,489,827 for "Light Controller With Occupancy Sensor" issued to Xia on Feb. 6, 1996, which, by this reference is incorporated herein in its entirety pursuant to MPEP 2163.07(b). What is not known is their combination and the synergy produced by the combination in providing, for a building construction stairwell, a noteworthy power conservation result.

Underlying the present invention is the recognition that in a building construction while such buildings rely primarily on elevators to transport workers to their offices, fire regulations require a back-up stairwell. Relegated to a back-up function, the stairwell requires nominal illumination. An exception might be for occasional exercise between adjacent floors, when the elevator is being repaired, or an individual becomes impatient with its unavailability. However, even the exceptions do not occur during off-hours, i.e., other than 9-5.

As a result of confining the application of bi-level technology to a stairwell, there has been eliminated the complexity of the prior patents, as will be explained in detail.

As a preferred embodiment, FIG. 1 schematically illustrates an energy-saving lighting control system 10 which is particularly well adapted to control the level of lighting provided by a pair of fluorescent lamp fixtures 12 and 14. For the sake of illustration, only two fixtures are shown in the drawing, it being understood that a significantly larger number (e.g. as many as 50 two-lamp fixtures) can be controlled by the output of the system. Thus, in a stairwell which, as known by common experience is a vertical shaft or opening containing a stairway, a pair of fluorescent lamp fixtures 12 and 14 would be located at each stairway landing at each building floor or possibly at every other stairway floor landing, for providing the illumination needs intended.

The respective levels of lighting provided by lamp fixtures 12 and 14 are controlled by the respective outputs of fluorescent dimming ballasts B-1 and B-2 which operate under the control of a programmable lamp controller, described below. To illustrate the flexibility of the system, two entirely different types of fluorescent dimming ballasts are indicated, B-1 being of the type that adjusts lamp intensity or brightness based on signals carried on three high voltage wires (i.e., neutral, N; switched hot, SH; and dimmed hot, DH); and B-2 being of the type that adjusts lamp intensity based on signals carried on two high voltage wires (i.e., N and SH) and two low voltage wires, common C and low voltage signal LV. The Hi-lume fluorescent lamp ballast, manufactured by Lutron Electronics Co., Inc., is exemplary of the B-1 ballast, and the Mark VII fluorescent lamp ballast, manufactured by Advance Transformer Co., is exemplary of the B-2 ballast. Typically, the high voltage hot wire varies between 100 and 277 volts AC, and the low voltage signal wire varies between 2 and 10 volts DC. The lighting control system of the invention can control either one or a combination of both types of ballasts. Being microprocessor controlled, the system of the invention can be readily programmed to provide the disclosed and various other features.

System 10 comprises a microprocessor-based lamp controller 16 which is adapted to receive power from an AC power source 18. The latter may vary in voltage between 100 and 277 volts, and may be either 50 or 60 hertz. The dimming ballast output of lamp controller 10 is determined by a plurality of input signals which are provided, for example, by a wall box control 20, an occupant sensor 22, a photo sensor 24 and a time cock 26. With the exceptions noted below, the input that requires the least energy consumption is the input that controls the lamp controller output. Input devices of the above type are well known; thus, only those particulars that relate to the invention will be mentioned. It suffices to say that the wall box dimmer control comprises a movable actuator 21 (shown as a slider, but might just as well be a rotary member) whose physical position determines the impedance of a potentiometer which, in turn determines the output voltage (e.g., 0-10 volts) of the control. When the actuator is at the extreme of its allowed range of movement, the wall control requests zero light, and when it is at its other extreme, it requests maximum light.

In accordance with the present invention, which correlates the illumination needs according to what is nominally in use, i.e., the stairwell during work hours, and even less frequently in use, i.e., the stairwell during off-hours, the noteworthy conservation of energy contemplates use in the stairwell normally of the low level illumination 14 during off hours and in this site high level illumination 12 otherwise when needed, these two illumination levels 12, 14 being characterized by being alternatively operational, by which is meant only one at any one time and using one for the other, whatever is the case, i.e., low level going to the high level and the high level going to the low level, but never both levels being operational simultaneously.

Also alternatively operational are the movement-sensing means 22 and the timer-sensing means 26, also characterized by working for each other as a control for the illumination levels 12, 14, wherein the movement-sensing means 22 is effective to switch from low level illumination 14 to high level illumination 12 as a result of sensing individual activity in the stairwell and, as a control, the timer-operated sensing means 26 taking over to allow the switched-to high level illumination 12 to be in continuous operation, as needed to safely use the stairway in the stairwell, but limited to a timed duration thereof, i.e. in the contemplated cessation of any individual activity in the stairwell. Without the limit placed on the use of the high level illumination 12 by the running out of time duration set for the time clock 26, during which there is no individual activity sensed in the stairwell and thus no need for the high level illumination for safe use of the stairway, the conservation utility of the system 10 would not be achieved.

Stated somewhat differently, the novelty of the system 10 is, at least in part, based on stairwell activity and non-activity, which are exactly opposite, and using sensing means with operating modes uniquely adapted to respond to these opposite circumstances, namely the occupant or movement sensor 22 and the time clock or timer-operated sensing means 16 to effectively operate a bi-level illumination system 10 contributes to using minimal power consumption.

While the bi-level illumination system herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. An electrically-operated method of providing illumination for a stairwell of an office building during work hours when the stairwell is nominally in use and even less frequently in use during office building work off-hours, said provided illumination being effective to minimize the consumption of power comprising the steps of:
   A. providing low level illumination in a stairwell during office building work hours for power conservation;
   B. providing high level illumination in said stairwell in substitution for said low level illumination as needed;
   C. operating a movement-sensing means in said stairwell for determining an individual's presence in said stairwell;
   D. receiving a signal from said movement-sensing means upon a determination in an operating thereof of an individual's presence in said stairwell:
   E. switching from said low level illumination to said high level illumination upon a received signal from said movement-sensing means; and
   F. using a timer-operating means for operating; said high level illumination to remain in continuous operation but only for a timed duration to correspondingly limit power consumption for said high level illumination to said timed duration;

whereby an initiation of and subsequent continuous timed operation of said high level illumination minimizes power consumption within the stairwell.

\* \* \* \* \*